United States Patent
Fujiwara

(10) Patent No.: US 8,241,780 B2
(45) Date of Patent: Aug. 14, 2012

(54) ALKALINE BATTERY

(75) Inventor: Michiko Fujiwara, Osaka (JP)

(73) Assignee: Panasonic Corporation, Osaka (JP)

( * ) Notice: Subject to any disclaimer, the term of this patent is extended or adjusted under 35 U.S.C. 154(b) by 47 days.

(21) Appl. No.: 12/600,790

(22) PCT Filed: Dec. 17, 2008

(86) PCT No.: PCT/JP2008/003816
§ 371 (c)(1),
(2), (4) Date: Nov. 18, 2009

(87) PCT Pub. No.: WO2010/038263
PCT Pub. Date: Apr. 8, 2010

(65) Prior Publication Data
US 2010/0297493 A1    Nov. 25, 2010

(30) Foreign Application Priority Data
Oct. 1, 2008 (JP) .................................. 2008-256457

(51) Int. Cl.
*H01M 2/00* (2006.01)
(52) U.S. Cl. ........................................ 429/163; 429/122
(58) Field of Classification Search .................. 429/206, 429/163
See application file for complete search history.

(56) References Cited

U.S. PATENT DOCUMENTS

| | | |
|---|---|---|
| 7,045,253 B2* | 5/2006 | Clash et al. ................... 429/229 |
| 2003/0180612 A1* | 9/2003 | Kilby et al. .................... 429/224 |
| 2004/0009400 A1 | 1/2004 | Yamaguchi et al. |
| 2004/0043292 A1 | 3/2004 | Christian et al. |
| 2004/0197656 A1* | 10/2004 | Durkot et al. ................. 429/229 |
| 2005/0019658 A1* | 1/2005 | Noya et al. .................... 429/223 |
| 2007/0248879 A1 | 10/2007 | Durkot et al. |
| 2009/0053595 A1 | 2/2009 | Izumi et al. |

FOREIGN PATENT DOCUMENTS

| | | | |
|---|---|---|---|
| JP | 07-183032 | | 7/1995 |
| JP | 2002198060 A | * | 7/2002 |
| JP | 2003-234107 | | 8/2003 |
| JP | 2004-047445 | | 2/2004 |
| JP | 2007-188714 | | 7/2007 |
| JP | 2007-227011 | | 9/2007 |
| JP | 2007-535113 | | 11/2007 |
| JP | 2008-034375 | | 2/2008 |

* cited by examiner

*Primary Examiner* — Barbara Gilliam
*Assistant Examiner* — Gary Harris
(74) *Attorney, Agent, or Firm* — McDermott Will & Emery LLP

(57) ABSTRACT

A positive electrode 2 and a negative electrode 3 are placed in a battery case 1 with a separator 4 interposed therebetween and the negative electrode 3 is smaller in height than the positive electrode 2 in the battery case 1. The positive electrode 2 contains electrolytic manganese dioxide and graphite and a potential of electrolytic manganese dioxide is in a range of 220 to 290 mV with respect to a reference electrode made of mercury oxide (Hg/HgO).

4 Claims, 1 Drawing Sheet

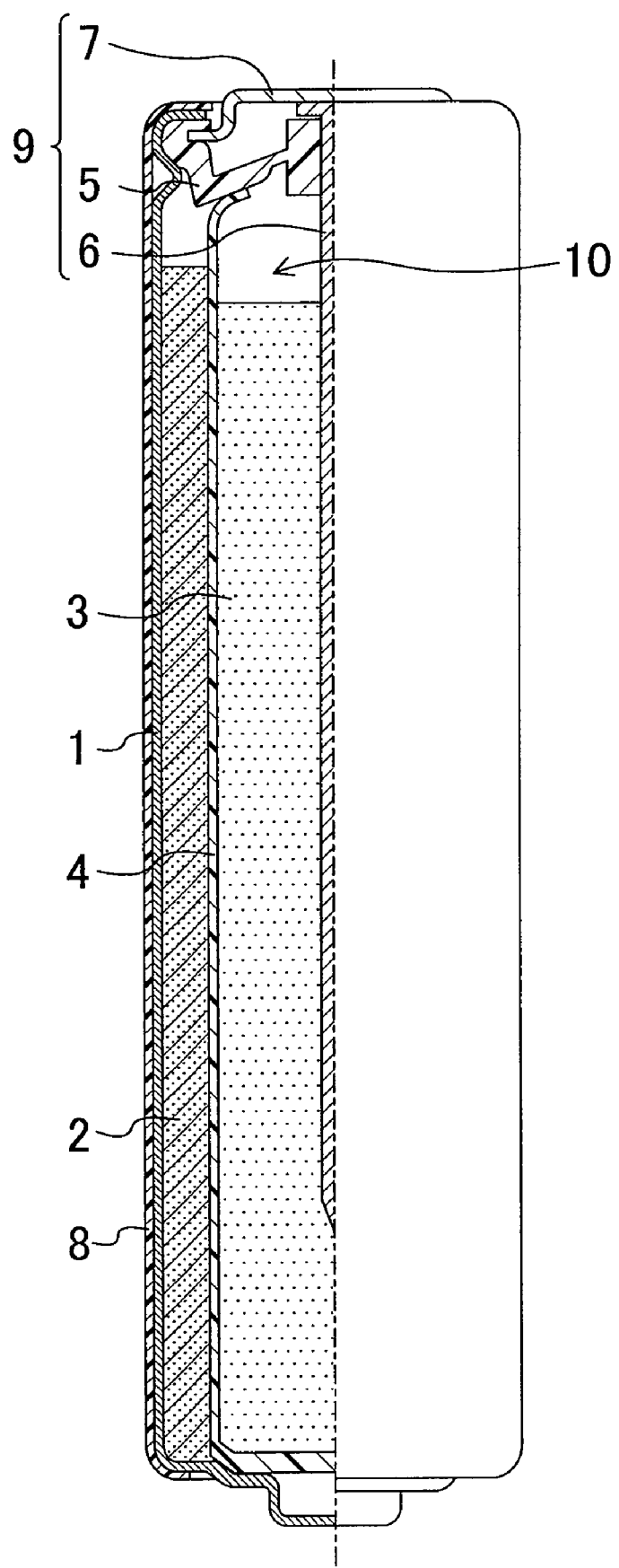

US 8,241,780 B2

ALKALINE BATTERY

RELATED APPLICATIONS

This application is the U.S. National Phase under 35 U.S.C. §371 of International Application No. PCT/JP2008/003816, filed on Dec. 17, 2008, which in turn claims the benefit of Japanese Application No. 2008-256457, filed on Oct. 1, 2008, the disclosures of which Applications are incorporated by reference herein.

TECHNICAL FIELD

The present invention relates to alkaline batteries using electrolytic manganese dioxide as a positive electrode active material.

BACKGROUND ART

For their high energy density per unit weight, alkaline batteries have widely been used as power sources of portable electronic devices which have rapidly been spread in recent years. Today, there are various alkaline batteries different in grades and price ranges adapted to different devices and applications, including regular alkaline batteries having a good discharge characteristic under a light load suitable for devices such as handheld game machines, high-performance alkaline batteries having a good discharge characteristic under a heavy load suitable for devices such as digital still cameras, and high-quality and high-performance alkaline batteries having a good discharge characteristic in a wide range from a high current to a low current.

A typical material as a positive electrode active material of the alkaline battery is electrolytic manganese dioxide (EMD). In order to provide batteries with a good discharge characteristic, various improvements and refinements have been done, e.g., by increasing a reaction area of manganese dioxide or raising a potential of manganese dioxide (see Patent Literature 1).

Patent Literature 1 Published Japanese Patent Application No. 2004-47445

Patent Literature 2 Published Japanese Patent Application No. 7-183032

DISCLOSURE OF THE INVENTION

Problem that the Invention is to Solve

If high-grade batteries and low-grade batteries are both manufactured in the same production line, total manufacture cost can be reduced.

In general, an alkaline battery includes a positive electrode and a negative electrode placed in a battery case with a separator interposed therebetween. In order to enhance reaction efficiency between the positive and negative electrodes, heights of the positive and negative electrodes placed in the battery case are kept the same to maximize an area in which they oppose each other.

When the low-grade batteries are manufactured in the production line for the high-grade batteries, the low-performance batteries can be manufactured at low cost by decreasing the amount of an active material of the positive and/or negative electrodes. However, decreasing the amount of the positive electrode active material is not very preferable because it brings about significant decrease in capacity.

On the other hand, zinc used as the negative electrode active material is more expensive than manganese dioxide used as the positive electrode active material. Therefore, decreasing the amount of the negative electrode active material makes it possible to effectively reduce the manufacture cost of the low-grade and low-performance batteries. In this case, the negative electrode becomes smaller in height than the positive electrode in the battery case. Accordingly, the area in which the positive and negative electrodes oppose each other is decreased and a discharge characteristic of the battery deteriorates. However, the degree of the deterioration is less severe than the decrease in capacity caused by decreasing the positive electrode active material. Therefore, discharge performance required for the low-grade batteries can be maintained.

The inventor of the present invention manufactured batteries and evaluated their performance. In the fabricated batteries, the negative electrode active material was decreased in amount while the positive electrode active material was not, i.e., the negative electrode was decreased in height while the positive electrode was not. The fabricated batteries were AA alkaline batteries using graphite-containing manganese dioxide as the positive electrode and zinc containing a gelling agent as the negative electrode.

Specifically, batteries 1 to 5 were manufactured using a positive electrode having a fixed height ($L_1$) of 40 mm and a negative electrode having a height ($L_2$) varied in a range of 42 to 34 mm. Table 1 shows the measurement results of an initial discharge characteristic, a discharge characteristic after a storage period and the ratio of the discharge characteristic after the storage period to the initial discharge characteristic (remaining percentage) of batteries 1 to 5.

TABLE 1

| | Positive electrode Height ($L_2$) mm | Negative electrode Height ($L_1$) mm | Height ratio ($L_2/L_1$) | Discharge performance | | |
| --- | --- | --- | --- | --- | --- | --- |
| | | | | Initial hr | After storage hr | Remaining percentage % |
| Battery 1 | 40 | 42 | 1.05 | 7.78 | 7.38 | 94.9 |
| Battery 2 | | 40 | 1.00 | 7.57 | 7.02 | 92.7 |
| Battery 3 | | 38 | 0.95 | 7.35 | 6.38 | 86.8 |
| Battery 4 | | 36 | 0.90 | 7.16 | 5.83 | 81.4 |
| Battery 5 | | 34 | 0.85 | 6.73 | 4.97 | 73.8 |

For the evaluation of the initial discharge characteristic, the batteries manufactured within a month were intermittently discharged under a medium load (an hour discharge per day at a current of 250 mA) to measure time (hr) to reach an end voltage of 0.9 V. For the evaluation of the discharge characteristic after the storage period, the batteries were stored for a week at 60° C. (corresponding to storage for a year at normal temperature) and discharged intermittently under the medium load, i.e., in the same condition for the initial discharge characteristic evaluation, to measure time (hr) to reach an end voltage of 0.9 V. A performance retaining characteristic was evaluated by the ratio of the discharge performance after the storage period to the initial discharge performance (remaining percentage).

A potential of electrolytic manganese dioxide was adjusted by changing the molar ratio between manganese and sulfuric acid in an electrolysis step using a manganese sulfate solution as an electrolyte solution. Then, the obtained electrolytic manganese dioxide was immersed in a 40% KOH aqueous solution and a potential difference from a reference electrode made of mercury oxide (Hg/HgO) was measured to obtain the potential of electrolytic manganese dioxide.

The heights of the positive and negative electrodes 2 and 3 were calculated by taking a picture of the battery using radiographic X-ray equipment, for example, and measuring a distance from a bottom surface to a top surface of the positive or negative electrode 2 or 3. When the top surface of the negative electrode 3 was not horizontal to the bottom surface thereof, a midpoint between a topmost part and a bottommost part of the top surface was regarded as the top surface and the distance was measured.

As shown in Table 1, the initial discharge characteristic deteriorated with the decrease in height of the negative electrode. This is considered as a natural consequence of the decrease in area in which the positive and negative electrodes oppose each other. However, unexpectedly, the remaining percentage was also considerably decreased with the decrease in height of the negative electrode. It has been considered that the decrease in remaining percentage, i.e., deterioration of the retaining characteristic, is caused by decrease in degree of oxidation of manganese dioxide reduced by an oxidation-reduction reaction between manganese dioxide and graphite in the positive electrode material mixture (see Patent Literature 2). Therefore, it has been assumed that the deterioration of the retaining characteristic does not occur even when the amount of the negative electrode is decreased, while the amount of the positive electrode is not.

In order to restore the retaining characteristic, the inventor manufactured batteries using low potential manganese dioxide on the ground that decreasing the potential of manganese dioxide inhibits the oxidation of graphite and the reduction of manganese dioxide (see Patent Literature 2).

Specifically, batteries 6 and 7 were manufactured using a positive electrode having a fixed height (36 mm) and manganese dioxide having a potential (200 mV, 150 mV) lower than the potential of manganese dioxide (306 mV) used in the battery 4 and at which the oxidation of graphite can be inhibited. Table 2 shows the measurement results of the initial discharge characteristic, the discharge characteristic after the storage period and the remaining percentage of these batteries.

TABLE 2

| | Positive electrode | | Negative | Height | Discharge performance | | |
|---|---|---|---|---|---|---|---|
| | Height $(L_1)$ mm | EMD potential mV | electrode Height $(L_2)$ mm | ratio $(L_2/L_1)$ — | Initial hr | After storage hr | Remaining percentage % |
| Battery 4 | 40 | 306 | 36 | 0.90 | 7.16 | 5.83 | 81.4 |
| Battery 6 | | 200 | | | 6.46 | 5.98 | 92.6 |
| Battery 7 | | 150 | | | 5.97 | 5.58 | 93.5 |

As shown in Table 2, in the batteries 6 and 7 in which the potential of manganese dioxide was lower than that of the battery 4, the remaining percentage was increased on one hand, but the initial discharge characteristic considerably deteriorated on the other hand. A conceivable cause of this result is decrease in activity of the positive electrode due to the decrease in potential of manganese dioxide.

In order to restore the retaining characteristic, the inventor manufactured batteries using a positive electrode in which the ratio of graphite in the positive electrode active material was decreased on the ground that decreasing the graphite ratio inhibits the oxidation of graphite and the reduction of manganese dioxide.

Specifically, a battery 8 was manufactured using a negative electrode having a fixed height (36 mm) and a positive electrode in which the graphite ratio (EMD:graphite=96.5:3.5) was lower than that in the battery 4 (EMD:graphite=95:5). Table 3 shows the measurement results of the initial discharge characteristic, the discharge characteristic after a storage period and the remaining percentage.

TABLE 3

| | Positive electrode | | Negative | Height | Discharge performance | | |
|---|---|---|---|---|---|---|---|
| | Height $(L_1)$ mm | Compounding ratio EMD:graphite | electrode Height $(L_2)$ mm | ratio $(L_2/L_1)$ — | Initial hr | After storage hr | Remaining percentage % |
| Battery 4 | 40 | 95.5 | 36 | 0.9 | 7.16 | 5.83 | 81.4 |
| Battery 8 | | 96.5:3.5 | | | 7.18 | 5.84 | 81.3 |

As shown in Table 3, the battery 8 in which the graphite ratio was lower than that in the battery 4 did not show any considerable change in initial discharge characteristic and remaining percentage after the storage period. The decrease in graphite ratio was not effective for restoring the retaining characteristic deteriorated by decreasing the negative electrode amount.

In view of the foregoing, the present invention has been achieved. An object of the invention is to provide an alkaline battery having good productivity and high cost performance and does not considerably deteriorate the retaining characteristic even if the amount of the negative electrode is decreased.

Means of Solving the Problem

In order to achieve the object of the present invention, in an alkaline battery in which a negative electrode is smaller in height than a positive electrode in a battery case, a potential of electrolytic manganese dioxide is in a range of 220 to 290 mV with respect to a reference electrode made of mercury oxide (Hg/HgO).

Specifically, an alkaline battery of the present invention is an alkaline battery including a positive electrode and a negative electrode placed in a battery case with a separator interposed therebetween, wherein the negative electrode is smaller in height than the positive electrode in the battery case, the positive electrode contains electrolytic manganese dioxide and graphite, and a potential of electrolytic manganese dioxide is in a range of 220 to 290 mV with respect to a reference electrode made of mercury oxide (Hg/HgO).

In a suitable embodiment, a weight ratio between the electrolytic manganese dioxide and the graphite is in a range of 90:10 to 94:6.

In a suitable embodiment, an initial open circuit voltage of the alkaline battery is in a range of 1.60 to 1.64 V.

In a suitable embodiment, the negative electrode contains zinc powder and the content of zinc powder having a particle diameter of 75 μm or less is in a range of 21 to 40%.

In a suitable embodiment, the negative electrode is a gelled negative electrode containing zinc powder and a density of the gelled negative electrode is in a range of 2.35 to 2.65 g/cm$^3$.

In a suitable embodiment, the ratio of the negative electrode height to the positive electrode height in the battery case is in a range of 0.85 to 0.975.

Effect of the Invention

According to the present invention, even when the negative electrode is smaller in height than the positive electrode in the battery case so that the amount of the negative electrode is decreased, the retaining characteristic is less likely to deteriorate. Thus, an alkaline battery can be provided with good productivity and high cost performance.

BRIEF DESCRIPTION OF DRAWINGS

FIG. 1 is a partial sectional view illustrating the structure of an alkaline battery according to an embodiment of the present invention.

EXPLANATION OF REFERENCE NUMERALS

1 Battery case
2 Positive electrode
3 Gelled negative electrode
4 Separator
5 Gasket
6 Negative electrode current collector
7 Negative electrode lead plate
9 Sealing unit
10 Space

BEST MODE FOR CARRYING OUT THE INVENTION

The present inventor studied about factors of the unexpected considerable decrease in remaining percentage after the storage period due to the decrease in height of the negative electrode other than the oxidation-reduction reaction between manganese dioxide and graphite. Then, the inventor has found the following.

As a result of analysis of gas present in the battery after the storage period, most of the gas was hydrogen gas. It is considered that the hydrogen gas was generated by corrosion of zinc powder in a gelled negative electrode and accumulated during the storage period in space 10 above the negative electrode 3 in the battery case 1 enlarged as a result of the decrease in height of the negative electrode 3 as shown in FIG. 1.

That is, the reduction reaction of manganese dioxide caused by the hydrogen gas accumulated in the space 10 was more pronounced than the effect of $CO_2$ gas generated by the oxidation of graphite. This is regarded as a cause of the deterioration of the retaining characteristic, i.e., the decrease in remaining percentage.

Based on the finding, the inventor has conceived that inhibiting the reduction reaction between manganese dioxide and hydrogen gas makes it possible to hinder the decrease in remaining percentage even when the height of the negative electrode 3 is decreased. For this purpose, it is effective to lower the activity of manganese dioxide. However, if the potential of manganese dioxide is decreased to a potential at which the oxidation of graphite can be inhibited (about 200 mV), the initial discharge performance is considerably decreased as described above. Therefore, the potential of manganese dioxide has to be decreased within a potential range higher than the potential at which the oxidation of graphite can be inhibited.

Hereinafter, an embodiment of the present invention will be explained with reference to the drawings. The embodiment does not limit the present invention.

FIG. 1 is a partial sectional view illustrating the structure of an alkaline battery according to an embodiment of the present invention. As shown in FIG. 1, a positive electrode 2 and a gelled negative electrode 3 are placed in a closed-bottomed battery case 1 with a separator 4 interposed therebetween. An opening of the battery case 1 is sealed with a sealing unit 9 integral with a gasket 5, a negative electrode current collector 6 and a negative electrode lead plate 7. The negative electrode 3 is smaller in height than the positive electrode 2 in the battery case 1 and the positive electrode 2 contains electrolytic manganese dioxide and graphite.

Table 4 shows the measurement results of an initial discharge characteristic, a discharge characteristic after a storage period and a remaining percentage of AA alkaline batteries 9 to 12 manufactured using a negative electrode 3 having a fixed height (36 mm) and electrolytic manganese dioxide having a potential (220 to 290 mV) lower than a potential of electrolytic manganese dioxide (306 mV) used in the battery 4 and higher than a potential at which graphite oxidation can be inhibited.

TABLE 4

|  | Positive electrode | | Negative electrode | Height | Discharge performance | | Remaining percentage % | Open circuit voltage V |
| --- | --- | --- | --- | --- | --- | --- | --- | --- |
|  | Height ($L_1$) mm | EMD potential mV | Height ($L_2$) mm | ratio ($L_2/L_1$) — | Initial hr | After storage hr | | |
| Battery 4 | 40 | 306 | 36 | 0.90 | 7.16 | 5.83 | 81.4 | 1.642 |
| Battery 9 |  | 290 |  |  | 7.12 | 6.43 | 90.3 | 1.640 |
| Battery 10 |  | 269 |  |  | 7.05 | 6.39 | 90.7 | 1.626 |
| Battery 11 |  | 241 |  |  | 6.97 | 6.37 | 91.4 | 1.613 |
| Battery 12 |  | 220 |  |  | 6.89 | 6.33 | 91.8 | 1.602 |

The initial discharge performance, the discharge characteristic after the storage period, the potential of electrolytic manganese dioxide and the heights of the positive and negative electrodes 2 and 3 shown in Table 4 were measured in the same manner as the measurements indicated in Tables 1 to 3.

As shown in Table 4, the batteries 9 to 12 in which the potential of electrolytic manganese dioxide was in the range of 220 to 290 mV hardly deteriorated the initial discharge performance relative to that of the battery 4 (EMD potential: 306 mV) in which the negative electrode 3 was decreased in height as shown in Table 2. That is, as compared with the batteries 6 and 7 in which the potential of electrolytic manganese dioxide was 200 mV or less, the initial discharge characteristic was significantly improved. Further, the remaining percentage after the storage period was restored to a level close to that of the battery 2 in which the negative electrode 3 had the same height as the positive electrode 2.

retaining characteristic was hardly restored (see Table 3). However, the inventor has found that the retaining characteristic improves when the graphite ratio in the positive electrode active material is increased.

Table 5 shows the measurement results of the initial discharge characteristic, the discharge characteristic after the storage period and the remaining percentage of AA alkaline batteries 13 to 20 manufactured using a negative electrode 3 having a fixed height (36 mm) and a positive electrode material mixture layer in which the graphite ratio was increased relative to that in the batteries 9 to 12 shown in Table 4 (EMD:graphite=95:5).

TABLE 5

| | Positive electrode | | | Negative electrode | Height | Discharge performance | | |
|---|---|---|---|---|---|---|---|---|
| | Height ($L_1$) mm | EMD potential mV | Compounding ratio EMD:graphite | Height ($L_2$) mm | ratio ($L_2/L_1$) — | Initial hr | After storage hr | Remaining percentage % |
| Battery 9 | 40 | 290 | 95:5 | 36 | 0.90 | 7.12 | 6.43 | 90.3 |
| Battery 13 | | | 94:6 | | | 7.12 | 6.59 | 92.6 |
| Battery 14 | | | 90:10 | | | 7.05 | 6.57 | 93.2 |
| Battery 10 | | 269 | 95:5 | | | 7.05 | 6.39 | 90.7 |
| Battery 15 | | | 94:6 | | | 7.07 | 6.58 | 93.1 |
| Battery 16 | | | 90:10 | | | 6.98 | 6.55 | 93.8 |
| Battery 11 | | 241 | 95:5 | | | 6.97 | 6.37 | 91.4 |
| Battery 17 | | | 94:6 | | | 6.98 | 6.50 | 93.1 |
| Battery 18 | | | 90:10 | | | 6.87 | 6.47 | 94.2 |
| Battery 12 | | 220 | 95:5 | | | 6.89 | 6.33 | 91.8 |
| Battery 19 | | | 94:6 | | | 6.86 | 6.45 | 94.0 |
| Battery 20 | | | 90:10 | | | 6.75 | 6.39 | 94.7 |

The above-described results indicate that setting the potential of electrolytic manganese dioxide to a potential (220 to 290 mV) higher than that at which the graphite oxidation can be inhibited makes it possible to obtain an alkaline battery capable of hindering the decrease in initial discharge performance and the deterioration of the discharge characteristic after the storage period, even if the amount of the negative electrode 3 is decreased. Accordingly, low-grade batteries having certain initial performance and retaining characteristic can be manufactured with good productivity by merely decreasing the amount of the negative electrode 3, or the height of the negative electrode 3. Thus, alkaline batteries can be provided with high cost performance.

As shown in Table 4, an initial open circuit voltage of a battery is uniquely determined by the potential of electrolytic manganese dioxide. Therefore, the present invention is effective in a battery having an initial open circuit voltage defined in a range of 1.60 to 1.64 V.

As described above, even when the compounding ratio of graphite in the positive electrode material mixture was decreased for the purpose of inhibiting the oxidation-reduction reaction between manganese dioxide and graphite, the As shown in Table 5, the batteries 13 to 20 in which the compounding ratio by weight between electrolytic manganese dioxide and graphite was in the range of 90:10 to 94:6 slightly decreased the initial discharge performance, but restored the remaining percentage after the storage period to a level equal to or higher than that of the battery 2 in which the negative electrode 3 have the same height as the positive electrode 2.

This effect is presumably resulted from the increase in graphite amount surrounding manganese dioxide. That is, the increase in graphite amount inhibited the reduction reaction of manganese dioxide by the hydrogen gas accumulated in the space 10 above the negative electrode 3 in the battery case 1, which is a factor of the deterioration of the retaining characteristic pronounced by the decrease in height of the negative electrode 3.

Therefore, as shown in Table 6, even when the height of the negative electrode 3 is decreased to 34 mm (the ratio between the heights of the positive and negative electrodes 2 and 3 ($L_2/L_1$)=0.85), an alkaline battery which does not deteriorate the retaining characteristic can be provided by increasing the graphite ratio in the positive electrode material mixture (EMD:graphite=90:10) as in a battery 21.

TABLE 6

| | Positive electrode | | | Negative electrode | Height | Discharge performance | | |
|---|---|---|---|---|---|---|---|---|
| | Height (L₁) mm | EMD potential mV | Compounding ratio EMD:graphite | Height (L₂) mm | ratio (L₂/L₁) — | Initial hr | After storage hr | Remaining percentage % |
| Battery 5 | 40 | 306 | 95:5 | 34 | 0.85 | 6.73 | 4.97 | 73.8 |
| Battery 21 | | 241 | 90:10 | | | 6.51 | 6.12 | 94.0 |
| Battery 22 | | 241 | 95:5 | 39 | 0.975 | 7.36 | 6.85 | 93.1 |

Further, as shown in Table 6, when the potential of electrolytic manganese dioxide was set to 241 mV in a battery 22 in which the height of the negative electrode 3 was reduced to 39 mm (the ratio between the heights of the positive and negative electrodes 2 and 3 ($L_2/L_1$)=0.975), the initial discharge characteristic and the remaining percentage after the storage ratio can be maintained to the same level as those of the battery 2 in which the negative electrode 3 has the same height as the positive electrode 2.

According to the present invention, the height of the negative electrode 3 is decreased and the potential of manganese dioxide is set within a certain range (220 mV to 290 mV) so that low-grade batteries configured to hinder the deterioration of the retaining characteristic are manufactured with good productivity. Therefore, a certain degree of the deterioration in initial discharge performance is acceptable.

In this situation, however, the inventor of the present invention has found that the deterioration of the initial discharge performance can be hindered by increasing, among zinc powder in the gelled negative electrode 3, the amount of zinc powder having a particle diameter of 75 μm or less (hereinafter this is referred to as fine powder).

Table 7 shows the measurement results of the initial discharge characteristic, the discharge characteristic after the storage period and the remaining percentage of AA alkaline batteries 23 to 25 manufactured using a negative electrode 3 having a fixed height (36 mm) and containing the fine powder in a content higher than 15% which was the fine powder content in the battery 11 shown in Table 4.

initial discharge performance and the remaining percentage were almost equal to those of the battery 2 in which the negative electrode 3 had the same height as the positive electrode 2.

This effect is presumably resulted from the following principle. By increasing the fine powder content in the zinc powder in the negative electrode 3, volumetric expansion of the negative electrode 3 in a discharge state is accelerated. Therefore, the negative electrode 3 is effectively increased in height to increase the area in which the positive and negative electrodes 2 and 3 oppose each other. As a result, the initial discharge characteristic is improved. In general, when the negative electrode 3 has the same height as the positive electrode 2, it is difficult to increase the fine powder content because the volumetric expansion of the negative electrode 3 may possibly bring about leakage of an electrolyte solution. However, according to the present invention, the height of the negative electrode 3 has been decreased and the sufficient space 10 lies above the negative electrode 3. Therefore, the leakage of the electrolyte solution is less likely to occur.

The similar effect can be obtained by lowering a density of the gelled negative electrode 3 (hereinafter referred to as a gel density). The volumetric expansion of the negative electrode 3 can be accelerated by decreasing the gel density. The gel density can be adjusted by varying the amount of a gelling agent or an electrolyte solution contained in the gelled negative electrode 3 relative to a certain amount of zinc.

Table 8 shows the measurement results of the initial discharge characteristic, the discharge characteristic after the

TABLE 7

| | Positive electrode | | Negative electrode | | Height | Discharge performance | | |
|---|---|---|---|---|---|---|---|---|
| | Height (L₁) mm | EMD potential mV | Height (L₂) mm | Fine powder content % | ratio (L₂/L₁) — | Initial hr | After storage hr | Remaining percentage % |
| Battery 11 | 40 | 241 | 36 | 15 | 0.90 | 6.97 | 6.37 | 91.4 |
| Battery 23 | | | | 21 | | 7.12 | 6.58 | 92.4 |
| Battery 24 | | | | 30 | | 7.35 | 6.72 | 91.4 |
| Battery 25 | | | | 40 | | 7.43 | 6.83 | 91.9 |

As shown in Table 7, the batteries 23 to 25 in which the fine powder content was in the range of 21 to 40% improved the initial discharge performance. The remaining percentage after the storage period was hardly changed. In particular, in the battery 25 in which the fine powder content was 40%, the storage period and the remaining percentage of AA alkaline batteries 26 to 28 manufactured using a negative electrode 3 having a fixed height (36 mm) and a gel density lower than 2.70 g/cm³ which was the gel density in the battery 11 shown in Table 4.

TABLE 8

| | Positive electrode | | Negative electrode | | Height ratio ($L_2/L_1$) | Discharge performance | | Remaining percentage % |
|---|---|---|---|---|---|---|---|---|
| | Height ($L_1$) mm | EMD potential mV | Height ($L_2$) mm | Gel density g/cm³ | | Initial hr | After storage hr | |
| Battery 11 | 40 | 241 | 36 | 2.70 | 0.90 | 6.97 | 6.37 | 91.4 |
| Battery 26 | | | | 2.65 | | 7.10 | 6.50 | 91.5 |
| Battery 27 | | | | 2.55 | | 7.21 | 6.68 | 92.6 |
| Battery 28 | | | | 2.35 | | 7.16 | 6.53 | 91.2 |

As shown in Table 8, the batteries 26 to 28 in which the gel density was in the range of 2.35 to 2.65 g/cm³ improved the initial discharge performance. The remaining percentage after the storage period was hardly changed.

The decrease in initial discharge performance caused by the decrease in height of the negative electrode 3 can be suppressed by increasing a length of part of the negative electrode current collector 6 immersed in the gelled negative electrode 3.

Table 9 shows the measurement results of the initial discharge characteristic, the discharge characteristic after the storage period and the remaining percentage of AA alkaline batteries 29 and 30 manufactured using a negative electrode 3 having a fixed height (36 mm) and a negative electrode current collector in which a length of the immersed part was increased relative to the length ($L_3$=21 mm) of the immersed part of the negative electrode current collector of the battery 11 shown in Table 4.

TABLE 9

| | Positive Electrode | | Negative electrode | Height ratio ($L_2/L_1$) | Negative electrode current collector | | Discharge performance | | Remaining percentage % |
|---|---|---|---|---|---|---|---|---|---|
| | Height ($L_1$) mm | EMD potential mV | Height ($L_2$) mm | | Immersed length ($L_3$) mm | ($L_3/L_2$) % | Initial hr | After storage hr | |
| Battery 11 | 40 | 241 | 36 | 0.90 | 21 | 58 | 6.97 | 6.37 | 91.4 |
| Battery 29 | | | | | 27 | 68 | 7.12 | 6.58 | 92.4 |
| Battery 30 | | | | | 32 | 80 | 7.25 | 6.68 | 92.1 |

As shown in Table 9, the batteries 29 and 30 in which the length of the immersed part of the negative electrode current collector was increased improved the initial discharge performance. In order to achieve the effect, the ratio ($L_3/L_2$) of the length ($L_3$) of the immersed part of the negative electrode current collector to the height of the negative electrode ($L_2$) is preferably 60% or more.

In the above description, a suitable embodiment of the present invention has been explained. However, the present invention is not limited to the embodiment and various modifications can be made. For example, the present invention may be effective not only for AA alkaline batteries, but also for alkaline batteries of other sizes. The present invention is not limited to the cylindrical alkaline batteries but may be applicable to rectangular alkaline batteries.

Industrial Applicability

The alkaline battery of the present invention has good productivity and high cost performance and is applicable to a wide range of electronic devices using dry batteries as power sources.

The invention claimed is:

1. An alkaline battery comprising a positive electrode and a negative electrode placed in a battery case with a separator interposed therebetween, wherein
the negative electrode is smaller in height than the positive electrode in the battery case,
the positive electrode contains electrolytic manganese dioxide as a principal positive electrode active material, and graphite,
a potential of electrolytic manganese dioxide is in a range of 220 to 290 mV with respect to a reference electrode made of mercury oxide (Hg/HgO) in a 40% KOH solution, and
the ratio of the negative electrode height to the positive electrode height in the battery case is in a range of 0.85 to 0.975,
a weight ratio between the electrolytic manganese dioxide and the graphite is in a range of 90:10 to 94:6, and
the negative electrode contains zinc powder and the content of zinc powder having a particle diameter of 75 μm or less is in a range of 21 to 40%.

2. The alkaline battery of claim 1, wherein
an initial open circuit voltage of the alkaline battery is in a range of 1.60 to 1.64 V.

3. An alkaline battery comprising a positive electrode and a negative electrode placed in a battery case with a separator interposed therebetween, wherein
the negative electrode is smaller in height than the positive electrode in the battery case, the positive electrode contains electrolytic manganese dioxide as a principal positive electrode active material, and graphite, a potential of electrolytic manganese dioxide is in a range of 220 to 290 mV with respect to a reference electrode made of mercury oxide (Hg/HgO) in a 40% KOH solution, and the ratio of the negative electrode height to the positive electrode height in the battery case is in a range of 0.85 to 0.975, a weight ratio between the electrolytic manganese dioxide and the graphite is in a range of 90:10 to 94:6, the negative electrode is a gelled negative electrode containing zinc powder and a density of the gelled negative electrode is in a range of 2.35 to 2.65 g/cm$^3$, wherein the content of zinc powder having a particle diameter of 75 µm or less is in a range of 21 to 40%.

4. the alkaline battery of claim 3, wherein an initial open circuit voltage of the alkaline battery is in a range of 1.60 to 1.64 V.

* * * * *